(12) United States Patent
Zheng et al.

(10) Patent No.: US 10,801,146 B2
(45) Date of Patent: Oct. 13, 2020

(54) SYSTEM FOR ANHYDROUS BOILING, BLEACHING AND DYEING USING SUPERCRITICAL CARBON DIOXIDE FLUID

(71) Applicant: DALIAN POLYTECHNIC UNIVERSITY, Dalian, Liaoning (CN)

(72) Inventors: Laijiu Zheng, Liaoning (CN); Shihui Gao, Liaoning (CN); Huanda Zheng, Liaoning (CN); Jun Yan, Liaoning (CN); Juan Zhang, Liaoning (CN); Youcai Guo, Liaoning (CN); Hong Li, Liaoning (CN)

(73) Assignee: DALIAN POLYTECHNIC UNIVERSITY, Dalian, Liaoning (CN)

( * ) Notice: Subject to any disclaimer, the term of this patent is extended or adjusted under 35 U.S.C. 154(b) by 211 days.

(21) Appl. No.: 15/779,057

(22) PCT Filed: Jan. 22, 2017

(86) PCT No.: PCT/CN2017/072035
§ 371 (c)(1),
(2) Date: May 24, 2018

(87) PCT Pub. No.: WO2018/090488
PCT Pub. Date: May 24, 2018

(65) Prior Publication Data
US 2018/0371664 A1    Dec. 27, 2018

(30) Foreign Application Priority Data
Nov. 21, 2016    (CN) .......................... 2016 1 1039625

(51) Int. Cl.
*D06B 9/06*    (2006.01)
*B01D 53/00*    (2006.01)
(Continued)

(52) U.S. Cl.
CPC ............. *D06B 9/06* (2013.01); *B01D 53/002* (2013.01); *B01D 53/04* (2013.01); *D06B 9/02* (2013.01);
(Continued)

(58) Field of Classification Search
CPC ........ D06B 9/02; D06B 9/06; D06B 2700/36; D06B 13/00; D06P 1/94; D06L 4/17
(Continued)

(56) References Cited

U.S. PATENT DOCUMENTS 2,904,969 A * 9/1959 Henry .................... F25B 17/00
                                                              62/174
4,517,916 A * 5/1985 Barch .................... D06B 1/148
                                                              118/234
(Continued)

FOREIGN PATENT DOCUMENTS

CN        1766194 A  *  5/2006
CN     101555665 A      10/2009
(Continued)

OTHER PUBLICATIONS

CN1766194—Machine Translation (Year: 2006).*
CN102828371—Machine Translation (Year: 2012).*

*Primary Examiner* — Marc Lorenzi
(74) *Attorney, Agent, or Firm* — Novick, Kim & Lee, PLLC; Allen Xue

(57) ABSTRACT

An system for anhydrous boiling, bleaching and dyeing using a supercritical carbon dioxide fluid and belongs to the field of textile. The system for anhydrous boiling, bleaching and dyeing of a supercritical carbon dioxide fluid provided by the present invention is provided with a co-solvent system, a boiling, bleaching and dyeing system, and a separation and recovery system which are specially designed. By means of uniform dispersion and dissolution of a co-solvent, dyestuff and carbon dioxide, boiling, bleaching
(Continued)

and dyeing production of jute fiber rough yarn can be achieved; meanwhile, the system for anhydrous boiling, bleaching and dyeing using a supercritical carbon dioxide fluid integrates the three functions of boiling, bleaching and dyeing, which can complete the boiling, bleaching and dyeing procedures in one step, and has the characteristic of high-efficiency, thus solving the problems of high contamination and high energy consumption of the jute fiber boiling, bleaching and dyeing procedures.

7 Claims, 5 Drawing Sheets

(51) Int. Cl.
*B01D 53/04* (2006.01)
*D06L 4/17* (2017.01)
*D06P 1/94* (2006.01)
*D06B 9/02* (2006.01)
*D06B 19/00* (2006.01)

(52) U.S. Cl.
CPC ............... *D06B 19/00* (2013.01); *D06L 4/17* (2017.01); *D06P 1/94* (2013.01); *D06B 2700/36* (2013.01); *D10B 2201/06* (2013.01); *Y02P 70/641* (2015.11)

(58) Field of Classification Search
USPC ........................................................ 68/12.07
See application file for complete search history.

(56) References Cited

U.S. PATENT DOCUMENTS

| | | | | |
|---|---|---|---|---|
| 5,938,794 | A | * | 8/1999 | Eggers ................. D06B 23/205 |
| | | | | 8/475 |
| 5,953,780 | A | * | 9/1999 | Schollmeyer ....... D06M 23/105 |
| | | | | 8/158 |
| 2002/0108183 | A1 | * | 8/2002 | Smith .................... D06B 19/00 |
| | | | | 8/115.51 |
| 2005/0166644 | A1 | * | 8/2005 | Gerald France ...... D06F 58/203 |
| | | | | 68/12.04 |
| 2012/0159720 | A1 | | 6/2012 | Carlson et al. |
| 2018/0119324 | A1 | * | 5/2018 | Long .................. B01D 46/0068 |

FOREIGN PATENT DOCUMENTS

| | | |
|---|---|---|
| CN | 102828371 A | 12/2012 |
| CN | 102852011 A | 1/2013 |
| CN | 106835758 A | 6/2017 |
| JP | 2004300588 A | 10/2004 |

* cited by examiner

SYSTEM FOR ANHYDROUS BOILING, BLEACHING AND DYEING USING SUPERCRITICAL CARBON DIOXIDE FLUID

TECHNICAL FIELD

The present invention relates to a system for anhydrous boiling, bleaching and dyeing of a supercritical carbon dioxide fluid and belongs to the field of textile.

BACKGROUND ART

The chemical compositions of jute fibers mainly comprise cellulose, hemicellulose, pectin, xylogen, waxiness, nitrogen substance, etc. The hemicellulose, the xylogen and the pectin are difficult to remove, and the degree of crystallinity and the degree of orientation of the jute fiber molecules are relatively high, which are easy to affect the extension, elasticity, bundling, flexibility and crimp tendency of the fibers, and bring a lot of inconveniences to the spinning and weaving process of the jute fibers. Therefore, the rough yarn boiling and bleaching of jute fibers has always been a problem concerned in a jute spinning industry. Over the years, many studies are based on solving the problem; however, people started to study the rough yarn boiling technologies till late 1950s, and performed wet spinning on the rough yarns after being boiled, to make concomitants be fully swelled, so as to remove partial impurities and increase the spinnability of the fibers. At the end of 1950s, our country successively researched and developed the rough yarn boiling technology of flax. After rough yarn boiling, the yarn forming intensity of the flax is larger than that of the grey yarn by about 10, and after bleached rough yarn is used, the intensity can further be increased by 10%.

Water is mainly used as medium in traditional jute fiber boiling and bleaching processing process, soda boiling, sodium chlorite bleaching, water washing, hydrogen peroxide bleaching, water washing, acid washing, and water washing processes are passed through in sequence to remove the hemicellulose, xylogen and pectin in the fiber, so as to finally meet the requirement on the fiber intensity and white degree of the jute rough yarn in the spinning process. After the boiling and bleaching process, the adhesive force between the jute cellfibres is reduced, the adhesive substance between the fibers is removed, and the fiber is difficult to have split, which is in favor of being processed into high count yarn and high grade product. Moreover, the traditional jute fiber boiling and bleaching process displays the defects of much water and power consumption, long technology process and high economic cost. Meanwhile, after the boiling and bleaching production, the discharged waste water contains a lot of sodium chlorite, sodium carbonate, hydrogen peroxide and other promoters that are difficult to be handled and bring about serious pollution to the environment.

When the temperature and pressure of the substance under normal state are higher than the critical temperature and critical pressure, the substance is converted into the supercritical fluid. Under the supercritical state, the tiny change of the pressure and temperature can lead to obvious difference in the fluid density, and is presented as the change of the dissolvability of the fluid, so that the supercritical fluid has great application value. Since Essen of West Germany held the first international conference "Supercritical Fluid Extraction" in 1978, in recent 30 years, the supercritical fluid extraction technology has been widely applied in medicine, chemical industry, food, environmental protection and other fields. The supercritical fluid extraction technology enables the supercritical fluid to be contacted with the separated substance by the relation between the dissolving capacity and the density of the supercritical fluid under the condition that the chemical composition is not changed, so that the ingredients with different polarities, boiling points and molecular weights are selectively extracted in sequence, and then the object of extraction separation is achieved through the effect of the temperature and pressure on the dissolving capacity of the supercritical fluid. In common substance, the carbon dioxide becomes the most widely applied supercritical fluid by the features of nontoxicity, innocuity, noninflammability, chemical inertness, special quadrupole moment structure, and relatively low critical temperature (31.TC) and critical pressure (7.37 MPa).

SUMMARY OF THE INVENTION

In order to solve the problems of high contamination and high energy consumption of the jute fiber boiling, bleaching and dyeing procedures, the present invention provides an system for anhydrous boiling, bleaching and dyeing of a supercritical carbon dioxide fluid, water medium is replaced by carbon dioxide to achieve boiling, bleaching and dyeing production of jute fiber rough yarn, and the boiling, bleaching and dyeing procedures can be completed at one step, which has major meaning to technical transformation and upgrading of the jute spinning industry. The supercritical carbon dioxide fluid in this disclosure also refers to a near-critical carbon dioxide fluid.

An system for anhydrous boiling, bleaching and dyeing of a supercritical carbon dioxide fluid comprises the following device units:

a carbon dioxide storage system for storing and/or producing carbon dioxide gas;

a co-solvent tank for storing co-solvent;

an ultrasonic atomizer for receiving the carbon dioxide from the carbon dioxide storage system and the co-solvent from the co-solvent tank, wherein the co-solvent is atomized in the ultrasonic atomizer and then mixed with the carbon dioxide to form a mixed fluid;

a booster pump and a heater, wherein the booster pump and the heater are used for receiving the mixed fluid or the carbon dioxide from the ultrasonic atomizer, or receiving the carbon dioxide from the carbon dioxide storage system; the mixed fluid of the carbon dioxide and the co-solvent enables the mixed fluid to become a supercritical carbon dioxide fluid dissolved with the co-solvent after being pressurized by the booster pump and heated by the heater; and the carbon dioxide becomes the supercritical carbon dioxide fluid after being pressurized by the booster pump and heating by the heater;

a dye vessel for receiving the supercritical carbon dioxide fluid from the heater;

a boiling, bleaching and dyeing kettle for receiving the supercritical carbon dioxide fluid dissolved with the co-solvent from the heater, or the supercritical carbon dioxide fluid dissolved with dye from the dyeing kettle; and a separation system for receiving the materials from the boiling, bleaching and dyeing kettle, wherein the separation system can conduct gas-solid separation to the materials.

A plurality of device units with the same function can be comprised in the system for anhydrous boiling, bleaching and dyeing of a supercritical carbon dioxide fluid according to the present invention, such as comprising a plurality of co-solvent tanks, a plurality of ultrasonic atomizers, a plurality of booster pumps and heaters, a plurality of dyeing kettles, a plurality of boiling, bleaching and dyeing kettles, etc. Those skilled in the art can set according to the requirement on the treatment amount.

The system for anhydrous boiling, bleaching and dyeing of a supercritical carbon dioxide fluid according to the present invention further comprises an infrared online monitoring system, and the infrared online monitoring system is composed of an infrared spectroscopy detector, a high-resolution photographic device and a BaF2 window.

The infrared online monitoring system is connected to a boiling, bleaching and dyeing system and a separation system, and can monitor the boiling, bleaching and dyeing effect and separation and recycle effect in time through the change of pipeline route. The boiling, bleaching and dyeing system is composed of a boiling, bleaching and dyeing kettle, a dye vessel and a magnetic circulation pump.

The system for anhydrous boiling, bleaching and dyeing of a supercritical carbon dioxide fluid according to the present invention further comprises a pipeline and a pipeline connecting device for connecting to the device units. The pipeline is the pipeline for connecting known by those skilled in the art, such as a steel pipe, etc. and the pipeline connecting device refers to a mechanical fastening part, such as a flange, a bolt, etc.

The system for anhydrous boiling, bleaching and dyeing of a supercritical carbon dioxide fluid according to the present invention further comprises a fluid delivery device and a flow display device, the fluid delivery device refers to a pump for the fluid known by those skilled in the art; and the flow display device refers to a device for displaying the fluid flow passing through the pipeline, such as a counter, a flow indicator, etc.

The system for anhydrous boiling, bleaching and dyeing of a supercritical carbon dioxide fluid according to the present invention further comprises a pressure detection and display device, and the pressure detection and display refer to a pressure meter, etc. for detecting the pressure of fluid or gas known by those skilled in the art.

The system for anhydrous boiling, bleaching and dyeing of a supercritical carbon dioxide fluid according to the present invention further comprises a temperature detection and display device, and the temperature detection and display refer to a thermometer, etc. for detecting the temperature of fluid or gas known by those skilled in the art.

The system for anhydrous boiling, bleaching and dyeing of a supercritical carbon dioxide fluid according to the present invention further comprises a flow regulation device, which is used for controlling the flow in a control pipeline, such as a valve, etc.

The system for anhydrous boiling, bleaching and dyeing of a supercritical carbon dioxide fluid according to the present invention further comprises a heating system, and the heating system is used for providing required heat source to the device units.

Further, the heating system is a heat transfer oil system, which comprises a heat transfer oil storage tank for storing the heat transfer oil, a heat transfer oil heating tank, and an oil pump. The heat transfer oil system can provide the heat source to the separator, the dyeing kettle, the boiling, bleaching and dyeing kettle in the device.

The system for anhydrous boiling, bleaching and dyeing of a supercritical carbon dioxide fluid according to the present invention further comprises a cyclic refrigerating system, and the cyclic refrigerating system is used for providing cold source to the device units.

Further, the cyclic refrigerating system is composed of a compressor, a water cooling tower, a ethylene glycol pump and a clean water pump. The cyclic refrigerating system is used for providing required cold source to a condenser.

Preferred system for anhydrous boiling, bleaching and dyeing of a supercritical carbon dioxide fluid according to the present invention comprises the magnetic circulation pump, and the magnetic circulation pump is used for circulating the materials in the boiling, bleaching and dyeing kettle. In order to conduct effective and sufficient boiling, bleaching and dyeing step to fiber, the boiling, bleaching and dyeing kettle according to the present invention is provided with a circulating pump, and the circulating pump can inject the supercritical carbon dioxide fluid flowing through the boiling, bleaching and dyeing kettle into the boiling, bleaching and dyeing kettle again to boiled, bleached and dyed repeatedly. One end of the circulating pump is connected to a fluid inlet of the boiling, bleaching and dyeing kettle, and the other end is connected to a fluid outlet of the boiling, bleaching and dyeing kettle through the pipeline.

The carbon dioxide storage system of preferred system for anhydrous boiling, bleaching and dyeing of a supercritical carbon dioxide fluid according to the present invention comprises a carbon dioxide storage tank, a carbon dioxide gas source is connected to the carbon dioxide storage tank through the gas delivery pump, and the carbon dioxide storage tank is connected to the ultrasonic atomizer through the pipeline. The direct connection to a gas tank on a carbon dioxide transport vehicle can be achieved by the gas delivery pump and the auxiliary pipeline thereof, and the filling of liquid carbon dioxide in the carbon dioxide storage tank is completed, which has the features of energy conservation and quick filling.

In the technical solution above, the carbon dioxide gas source can be a carbon dioxide generator or a carbon dioxide gas tank car.

The separation system of preferred system for anhydrous boiling, bleaching and dyeing of a supercritical carbon dioxide fluid according to the present invention comprises a cooler receiving the materials from the boiling, bleaching and dyeing kettle, a cooler downstream is connected to the separator through the pipeline, and the materials are separated in the separator; and a separator downstream is connected to a adsorption vessel, and the adsorption vessel is used for adsorbing residual boiling and bleaching products and dye auxiliaries in the supercritical carbon dioxide fluid.

The separator is internally provided with a separation bed, the separation bed is in a multi-layer and gradually changed grid structure, grid bore diameter is gradually changed from 5 mm to 0.05 mm from bottom to top. Meanwhile, the back flushing of the carbon dioxide gas can be achieved through the change of pipeline, so as to solve the cleaning problem of the separation bed.

Preferred system for anhydrous boiling, bleaching and dyeing of a supercritical carbon dioxide fluid according to the present invention comprises the condenser, the condenser receives the carbon dioxide from the adsorption vessel and cools the carbon dioxide; and the outlet end of the condenser is connected to the carbon dioxide storage tank.

Preferred ultrasonic atomizer according to the present invention comprises an ultrasonic generator, a multi-hole liquid-gas distributor and an atomization chamber, a gas inlet, a gas channel and a gas outlet, wherein the co-solvent pipeline is communicated with the atomization chamber, the atomization chamber is located at the bottom of the ultrasonic atomizer, and the ultrasonic generator is located in the atomization chamber; and the multi-hole liquid-gas distributor is arranged on the atomization chamber, the gas channel is arranged on the multi-hole liquid-gas distributor, one side of the gas channel is provided with the gas inlet, and the gas inlet is communicated with the carbon dioxide carbon dioxide storage tank through the pipeline.

The multi-hole liquid-gas distributor according to the present invention is composed of 3-10 pieces of porous central pipes, a plurality of multi-hole columns, a porous pipe distribution plate I, and a porous pipe distribution plate II. Wherein, the porous central pipe is a bottom opening, the top end is in a closed structure, and the inner diameter of the central pipe is 10-20 mm; a pipe wall of the porous central pipe is provided with a through hole, and the pore is 0.5-2 mm; the bottom of the multi-hole column is closed, the top end is in an opening structure, and the inner diameter of the column is 1-10 mm; and a column wall of the multi-hole column is provided with the through hole, and the pore is 0.5-2 mm; and the porous central pipe is surrounded by the multi-hole columns. One side of the multi-hole liquid-gas distributor is provided with a mixing fluid outlet, and the mixing fluid outlet is connected to the booster pump through the pipeline.

The boiling, bleaching and dyeing kettle according to the present invention is internally loaded with a boiling and bleaching unit, and the boiling, bleaching and dyeing unit is mainly composed of a bottom distributor, the porous central pipe and an externally connected cylinder body. The bottom distributor of the boiling and bleaching unit is connected to the fluid inlet of the boiling, bleaching and dyeing kettle, and the gas inlet of the externally connected cylinder body is connected to the fluid outlet of the boiling, bleaching and dyeing kettle. Wherein, there are 1 to 5 porous central pipes, the diameter of the porous central pipe is 35 mm, and the pore of the porous central pipe is 1 mm-5 mm.

The dye vessel according to the present invention comprises a dye cylinder, the bottom end and the top end thereof are respectively provided with a carbon dioxide fluid inlet and a charging opening, the carbon dioxide fluid inlet is connected to the fluid inlet of the dye cylinder; and a valve III, a material mixing bin II, a valve II, a material mixing bin I, a valve I and a charging bin are successively arranged from the outlet to the top.

The bottom of the dye cylinder body is provided with the gas inlet, the cylinder body is internally provided with the central pipe connecting plate, the multi-hole distribution plate and the top multi-hole distribution plate from bottom to top, and the multi-hole distribution plate and the top multi-hole distribution plate are both fixed with the circumference in the cylinder body; a cavity between the bottom end of the cylinder body and the central pipe connecting plate forms the bottom gas channel; the central pipe connecting plate is provided with the porous pipe communicated with the bottom gas channel, the porous pipe is the bottom opening, the top end is in a closed structure, and the pipe wall of the porous pipe is provided with the through holes; the multi-hole distribution plate is provided with the through hole; the central area of the top multi-hole distribution plate is in a sealing structure for sealing the top end of the porous pipe, and the periphery is in a multi-hole cyclic structure; and the top of the cylinder body is provided with the gas outlet, and the cavity between the top of the cylinder body and the top multi-hole distribution plate is a top gas mixing channel.

Further, the charging bin comprises the valve I, the material mixing bin I, the valve II, the material mixing bin II and the valve III. The timely addition of dye and auxiliaries in the boiling, bleaching and dyeing process can be achieved.

The system for anhydrous boiling, bleaching and dyeing of a supercritical carbon dioxide fluid according to the present invention can meet the requirement on integrated process of boiling, bleaching and dyeing of flax, apocynum venetum, ramie and hemp.

Regarding to the method using the system to conduct the supercritical carbon dioxide bio-enzyme boiling, bleaching and dyeing to the jute rough yarn, the technology is as follows:

1. supercritical boiling and bleaching technology: the jute rough yarn, the dye and the bio-enzyme boiling and bleaching agent solution are successively placed into the boiling, bleaching and dyeing kettle, the dye vessel and the co-solvent tank; the carbon dioxide storage system is opened to fill the carbon dioxide into the ultrasonic atomizer, so that the flow rate of the carbon dioxide is 1-5 $m^3/h$; the bio-enzyme boiling and bleaching agent solution is injected into the ultrasonic atomizer, and is atomized through the effect of the ultrasonic generator; the mixed fluid of the carbon dioxide and the atomized bio-enzyme boiling and bleaching agent solution is mixed in the ultrasonic atomizer; the carbon dioxide uniformly dissolved with the bio-enzyme boiling and bleaching agent enters a supercritical status under the effect of the heater, and is injected into the interior of the boiling, bleaching and dyeing kettles under the effect of the booster pump, the internal circulation and/or external boiling and bleaching are conducted to the jute fiber rough yarn under the effect of the magnetic circulation pump, and the conditions of the supercritical boiling and bleaching technology are: the temperature 25-70° C., the pressure 8-30 MPa and the boiling and bleaching time 10-60 min;

2. supercritical boiling and bleaching-separation technology: the magnetic circulation pump is closed, the boiling and bleaching-separation procedure is conducted under the effect of the booster pump, and the conditions of the boiling and bleaching-separation technology are: the temperature 25-70° C., the pressure 8-30 MPa and the boiling and bleaching-separation time 10-30 min; and 3. supercritical dyeing technology: after the boiling and bleaching-separation technology is finished, the co-solvent tank is closed, and the dye vessel and the boiling, bleaching and dyeing kettle are heated up by the heater to 80-120 C; during dyeing processing, the dye vessel is connected into the boiling, bleaching and dyeing system firstly, the carbon dioxide in the carbon dioxide storage system flows out to enter a supercritical status under the effect of the heater, and is injected into the dye vessel under the effect of the booster pump; the supercritical carbon dioxide fluid firstly flows into the dye vessel to dissolve the dye in the dye vessel, and then enters the boiling, bleaching and dyeing kettle to dye the jute fiber rough yarn in the boiling, bleaching and dyeing kettle, and internal dyeing and external dyeing processing is conducted to the jute fiber rough yarn under the effect of the magnetic circulation pump; and after the dyeing is finished, the supercritical carbon dioxide fluid dissolved with the dye is separated in the separation system to achieve the full separation of the dye and the gas carbon dioxide.

Further, the boiling and bleaching-separation technology is that: the booster pump is opened to enable the fresh supercritical carbon dioxide to enter the boiling, bleaching and dyeing kettles, and use the fresh supercritical carbon dioxide to conduct boiling and bleaching, and the materials in the boiling, bleaching and dyeing kettles are successively sent into a separator for separation during boiling and bleaching.

Further, the technology conditions are as follows:
1. the supercritical boiling and bleaching technology: the temperature is 25-70° C., the pressure is 8-30 MPa and the boiling and bleaching time is 10-60 min;
2. the supercritical boiling and bleaching-separation technology: the temperature is 25-70° C., the pressure is 8-30 MPa and the boiling and bleaching time is 10-30 min;
3. the supercritical dyeing technology: the temperature is 80-120° C., the pressure is 18-30 MPa and the boiling and bleaching time is 10-60 min.

The present invention has the beneficial effect that: compared with the prior art, the outstanding feature of the present invention is a system for anhydrous boiling, bleaching and dyeing of a supercritical carbon dioxide fluid, which is provided with a co-solvent system, a boiling, bleaching and dyeing system, and a separation and recovery system which are specially designed. By means of uniform dispersion and dissolution of a co-solvent, dyestuff and carbon dioxide, boiling, bleaching and dyeing production of jute fiber rough yarn can be achieved; meanwhile, the system for anhydrous boiling, bleaching and dyeing of a supercritical carbon dioxide fluid integrates the three functions of boiling, bleaching and dyeing, which can complete the boiling, bleaching and dyeing procedures at one step, and has the characteristic of high-efficiency, thus solving the problems of high contamination and high energy consumption of the jute fiber boiling, bleaching and dyeing procedures.

DETAILED DESCRIPTIONS OF THE PREFERRED EMBODIMENTS

Figure 1:
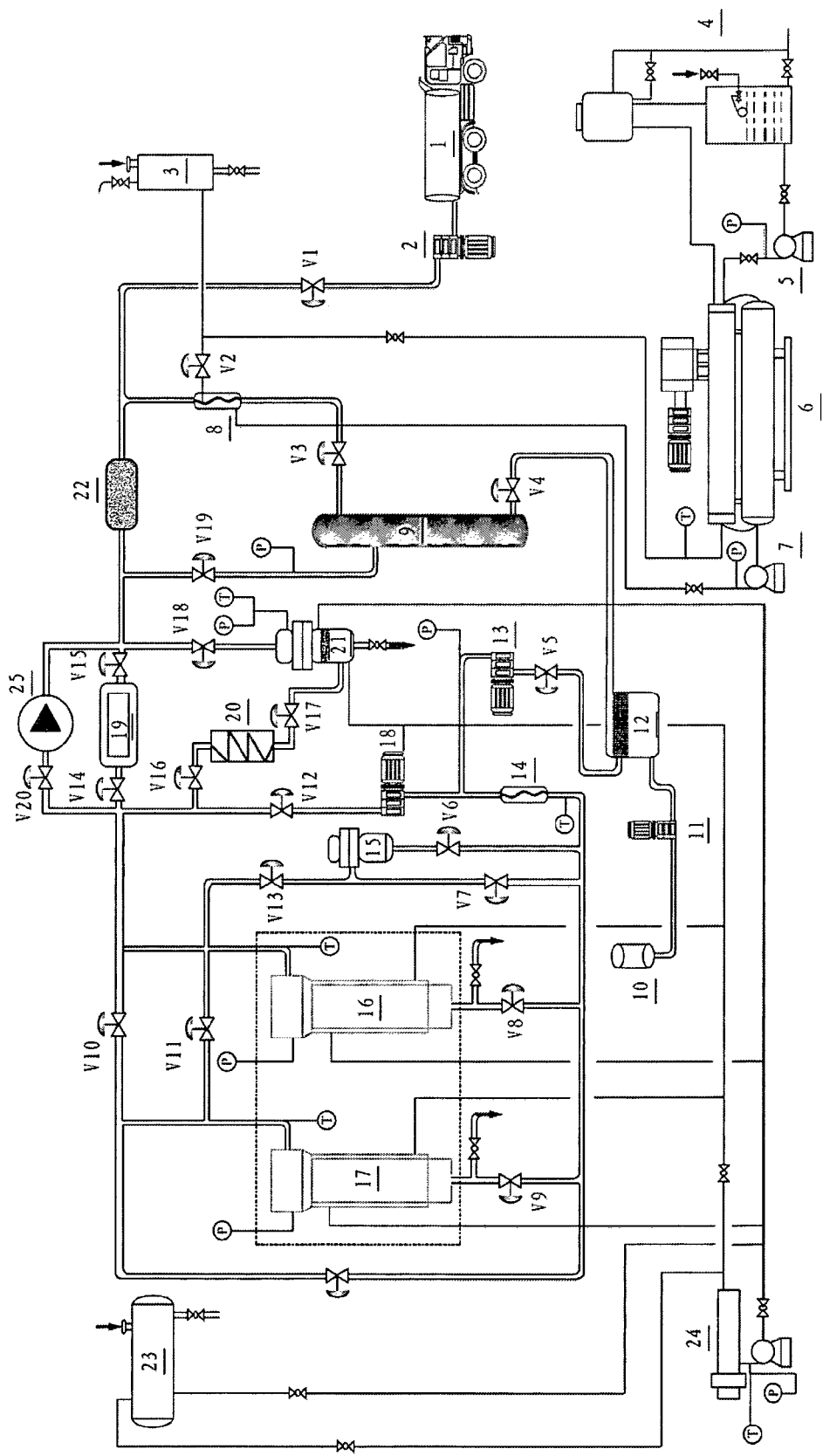
FIG. 1 is a schematic diagram of a system for anhydrous boiling, bleaching and dyeing of a supercritical carbon dioxide fluid, wherein the numeral references are as follows:
1 refers to carbon dioxide tanker, 2 refers to gas delivery pump, 3 refers to ethylene glycol tank, 4 refers to water cooling tower, 5 refers to clean water pump, 6 refers to compressor, 7 refers to ethylene glycol pump, 8 refers to condenser, 9 refers to carbon dioxide storage tank, 10 refers to co-solvent tank, 11 refers to fluid delivery pump, 12 refers to ultrasonic atomizer, 13 refers to booster pump, 14 refers to heater, 15 refers to dye storage tank, 16 and 17 refer to boiling, bleaching and dyeing kettles, 18 refers to magnetic circulation pump, 19 refers to online monitoring system, 20 refers to cooler, 21 refers to separator, 22 refers to adsorption vessel, 23 refers to heat transfer oil tank, 24 refers to heat transfer oil system, and 25 refers to compressor.
Figure 2:
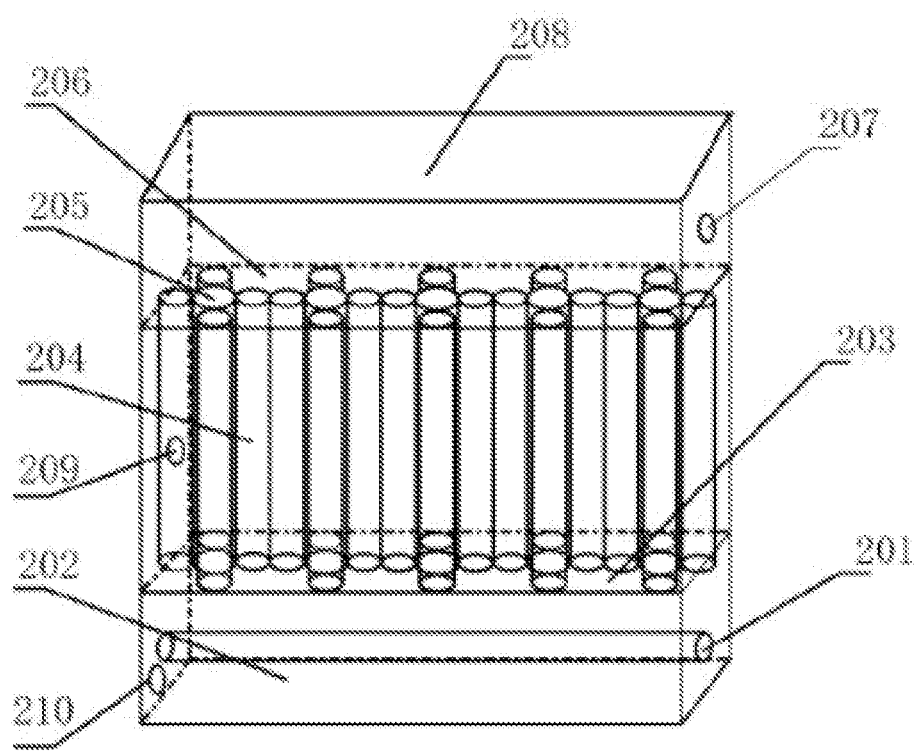
FIG. 2 is a schematic diagram of an ultrasonic atomizer in the boiling, bleaching and dyeing kettle in the system for anhydrous boiling, bleaching and dyeing of a supercritical carbon dioxide fluid, wherein the numeral references are as follows:
201 refers to ultrasonic generator, 202 refers to atomization chamber, 203 refers to multi-hole distribution plate I, 204 refers to porous cylinder, 205 refers to porous central pipe, 206 refers to multi-hole distribution plate II, 207 refers to gas inlet, 208 refers to gas channel, 209 refers to gas outlet, and 210 refers to co-solvent inlet.
Figure 3:
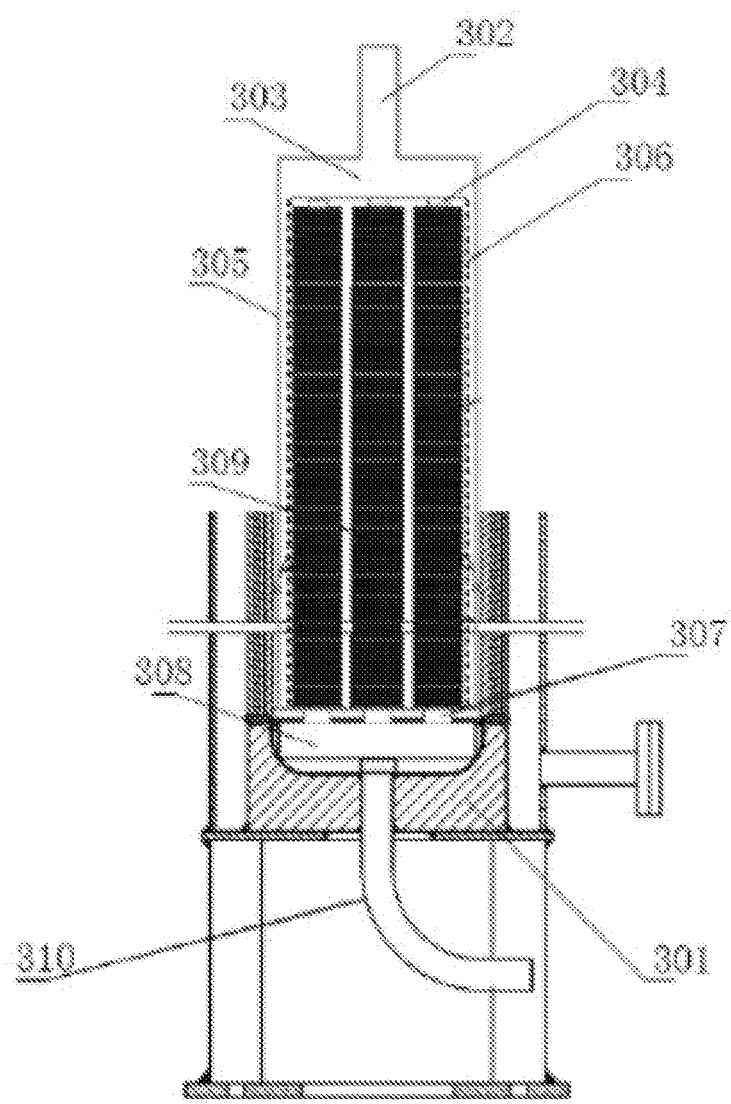
FIG. 3 is a schematic diagram of a boiling, bleaching and dyeing kettle loaded with a boiling and bleaching unit in the system for anhydrous boiling, bleaching and dyeing of a supercritical carbon dioxide fluid, wherein the numeral references are as follows:
301 refers to boiling, bleaching and dyeing kettle, 302 refers to gas inlet, 303 refers to top gas channel, 304 refers to top end seal of porous central pipe, 305 refers to outer sleeve, 306 refers to inner-layer porous sleeve, 307 refers to porous central pipe, 308 refers to bottom distributor, 309 refers to jute fiber rough yarn spindle, and 310 refers to fluid inlet at the bottom of boiling, bleaching and dyeing kettle.
Figure 4:
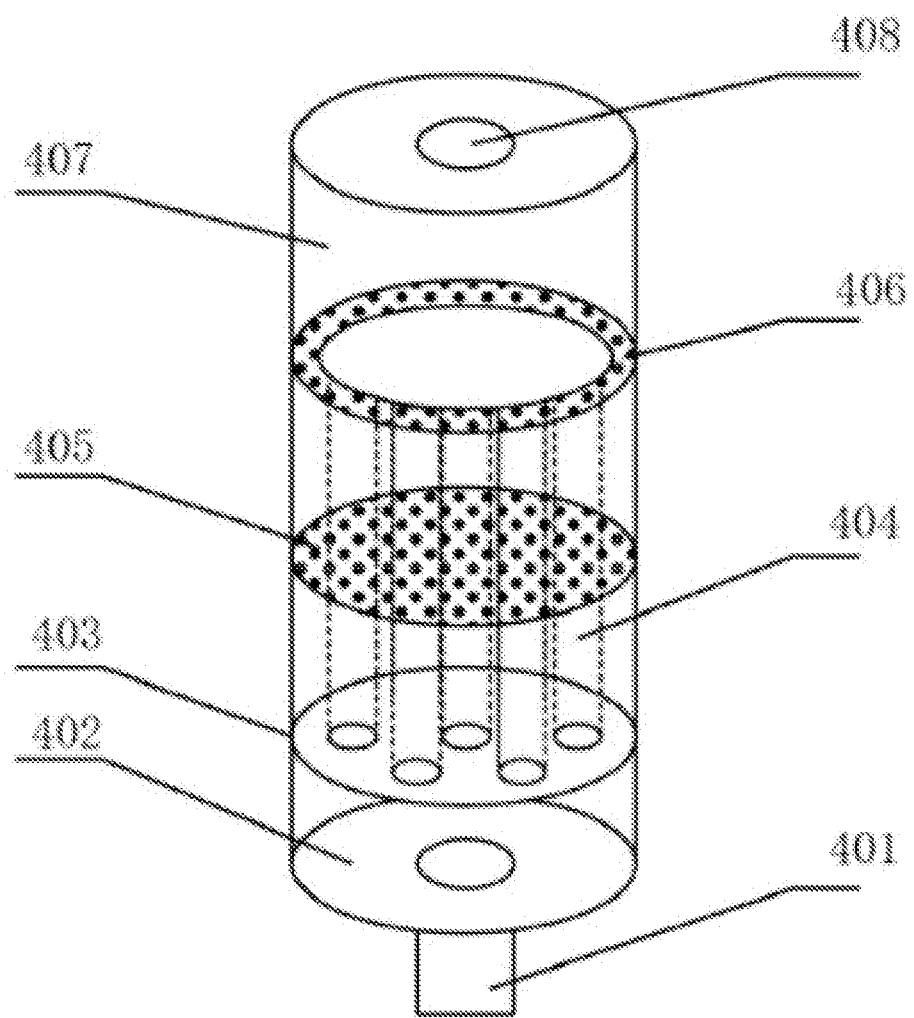
FIG. 4 is a schematic diagram of a dye cylinder in the boiling, bleaching and dyeing kettle in the system for anhydrous boiling, bleaching and dyeing of a supercritical carbon dioxide fluid, wherein the numeral references are as follows:
401 refers to gas inlet, 402 refers to bottom gas channel, 403 refers to central pipe connecting plate, 404 refers to porous pipe, 405 refers to multi-hole distribution plate, 406 refers to top multi-hole distribution plate, 407 refers to top gas mixing channel, and 408 refers to gas outlet.
Figure 5:
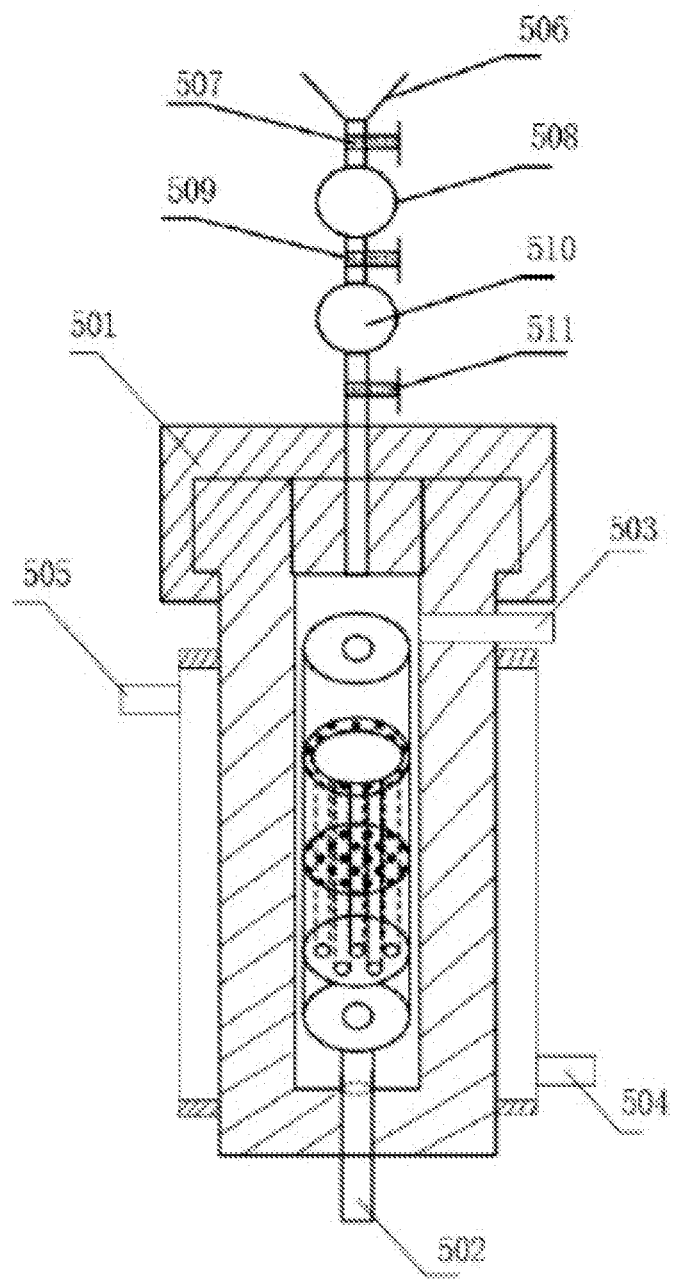
FIG. 5 is a schematic diagram of the boiling, bleaching and dyeing kettle in the system for anhydrous boiling, bleaching and dyeing of a supercritical carbon dioxide fluid, wherein the numeral references are as follows:
501 refers to quick-opening sealing cover, 502 refers to carbon dioxide fluid inlet, 503 refers to carbon dioxide fluid outlet, 504 refers to heat transfer medium inlet, 505 refers to heat transfer medium outlet, 506 refers to charging bin, 507 refer to valve I, 508 refers to material mixing bin I, 509 refers to valve II, 510 refers to material mixing bin II, and 511 refers to valve III.

The following non-restrictive embodiments can enable those skilled in the art understand the invention to more comprehensively, but the invention is not limited by any manner.

A regular method is used in the experiment methods described in the following embodiments unless otherwise stated; and both reagent and materials can be obtained by a commercial way.

An system for anhydrous boiling, bleaching and dyeing of a supercritical carbon dioxide fluid comprises the following device units:
a carbon dioxide storage system, wherein the a carbon dioxide storage system comprises a carbon dioxide storage tank 9, a carbon dioxide tanker 1 is connected to the carbon dioxide storage tank 9 through a gas delivery pump 2, and the carbon dioxide storage tank 9 is connected to an ultrasonic atomizer 12 through a pipe;
a co-solvent tank 10 for storing co-solvent;
an ultrasonic atomizer 12 for receiving the carbon dioxide from the carbon dioxide storage system and the co-solvent from the co-solvent tank 10, wherein the co-solvent is atomized in the ultrasonic atomizer 12 and then mixed with the carbon dioxide to form a mixed fluid;
a booster pump 13 and a heater 14, wherein the booster pump and the heater are used for receiving the mixed fluid of the carbon dioxide and the co-solvent or the carbon dioxide from the ultrasonic atomizer 12, or receiving the carbon dioxide from the carbon dioxide storage system; the mixed fluid enables the mixed fluid to become a supercritical carbon dioxide fluid dissolved with the co-solvent after being pressurized by the booster pump 13 and heated by the heater 14; and the carbon dioxide becomes the supercritical carbon dioxide fluid after the carbon dioxide fluid is pressurized by the booster pump 13 and heating by the heater 14;
a dye vessel 15 for receiving the supercritical carbon dioxide fluid from the heater 14;
a boiling, bleaching and dyeing kettle 16 and a boiling, bleaching and dyeing kettle 17 for receiving the supercritical carbon dioxide fluid dissolved with the co-solvent from the heater 14, or the supercritical carbon dioxide fluid dissolved with dye from the dye vessel 15; and a separation system for receiving the materials from the boiling, bleaching and dyeing kettle, wherein the separation system can conduct gas-solid separation to the materials. The separation system comprises a cooler 20 for receiving the materials from the boiling, bleaching and dyeing kettle, the downstream of the cooler 20 is connected to a separator 21 through a pipeline, the materials are separated in the separator 21; the downstream of the separator 21 is connected to an adsorption vessel 22, and the adsorption vessel 22 is used for adsorbing residual boiling and bleaching products, and dye auxiliaries in the carbon dioxide.

The device comprises a magnetic circulation pump 18, and the magnetic circulation pump 18 is used for circulating the materials in the boiling, bleaching and dyeing kettle.

The device comprises a condenser 8, the condenser 8 receives and cools the supercritical carbon dioxide from the adsorption vessel; and the outlet end of the condenser 8 is connected to the carbon dioxide storage tank 9.

The device comprises a heating system, the heating system is used for providing a required heat source to the device units, and the heating system is a heat transfer oil system, which comprises a heat transfer oil head tank 23 for storing the heat transfer oil and the heat transfer oil system 24. The heat transfer oil system comprises a heat transfer oil storage tank for storing the heat transfer oil, a heat transfer oil heating tank, and an oil pump, and can provide heat source to the separator 21, the dye vessel 15, and the boiling, bleaching and dyeing kettles 16 and 17 in the device.

The device comprises a cyclic refrigerating system, and the cyclic refrigerating system is used for providing a required cold source to the device units. The cyclic refrigerating system is composed of a compressor 6, a water cooling tower 4, an ethylene glycol pump 7 and a clean water pump 5. The cyclic refrigerating system is used for providing required cold source to the condenser 8.

The ultrasonic atomizer comprises an ultrasonic generator 201, a multi-hole liquid-gas distributor and an atomization chamber 202, a gas inlet 207, a gas channel 208 and a gas outlet 209, wherein the co-solvent pipeline is communicated with the atomization chamber 202, the atomization chamber 202 is located at the bottom of the ultrasonic atomizer, and the ultrasonic generator 201 is located in the atomization chamber 202; and the multi-hole liquid-gas distributor is arranged on the atomization chamber 202, the gas channel 208 is arranged on the multi-hole liquid-gas distributor, one side of the gas channel 208 is provided with the gas inlet 207, and the gas inlet 207 is communicated with the carbon dioxide carbon dioxide storage tank 9 through the pipeline. The working principle is that: on one hand, the co-solvent is injected into the ultrasonic atomizer through the co-solvent inlet 210 under the effect of the fluid delivery pump, and is atomized under the vibration of the ultrasonic generator 201. The atomized co-solvent firstly enters the porous central pipe 205 connected to the multi-hole distribution plate I 203, and can flow out through the small holes along the porous central pipe 205. On the other hand, the carbon dioxide enters the gas channel 208 through the gas inlet 207, enters a porous cylinder 204 connected to the porous pipe distribution plate II 206 through the porous pipe distribution plate II 206, and flows out through the small holes along the porous cylinder 204. The co-solvent in an atomization status is mutually mixed with the carbon dioxide gas, so that gaseous and liquid phases are sufficiently mixed in a multi-hole liquid-gas distributor. Subsequently, the gas-liquid mixed fluid enters the boiling and bleaching system through the gas outlet 209.

The boiling, bleaching and dyeing kettle used in the following embodiment can refer to supercritical carbon dioxide cone yarn dye vessel in Chinese Patent with the publication No. CN102787459A, such as the dye vessel recorded in embodiment 1. The boiling, bleaching and dyeing kettle is composed of a kettle body and the boiling and bleaching kettle loaded in the kettle body. The bottom of the kettle body is provided with the fluid inlet of the boiling, bleaching and dyeing kettle, and the top is provided with the fluid outlet of the boiling, bleaching and dyeing kettle. The boiling, bleaching and dyeing unit is mainly composed of a bottom distributor 308, the porous central pipe 307 and an externally connected cylinder body. The externally connected cylinder body is composed of the gas inlet 302, the top gas channel 303, the top end sealing of porous central pipe 304, the outer sleeve 305, and the inner-layer multi-hole sleeve 306. The inner-layer porous sleeve 306 is sleeved in the outer sleeve 305, the top of the outer sleeve 305 is provided with the gas inlet 302, a cavity exists between the gas inlet 302 and the inner-layer porous sleeve 306, and the cavity is the top gas channel 303; the inner-layer porous sleeve 306 is internally provided with a plurality of porous central pipes 307, and the top end of the porous central pipe 307 is sealed by the top end sealing of porous central pipe 304; and the lower end of the porous central pipe 307 is communicated with the bottom distributor 308. The bottom distributor of the boiling and bleaching unit is connected to the fluid inlet of the boiling, bleaching and dyeing kettle, and the gas inlet 302 of the externally connected cylinder body is connected to the fluid outlet located at the upper part of the boiling, bleaching and dyeing kettles 16 and 17. Wherein, there are 6 porous central pipes 307, the diameter of the porous central pipe 307 is 35 mm, and the pore diameter of the porous central pipe 307 is 1 mm.

The working principle is that: during the boiling, bleaching and dyeing production, the carbon dioxide fluid flows through the gas inlet 302 (externally connected cylinder body), enters the gas channel formed by the outer sleeve 305 and the inner-layer porous sleeve 306 after passing through the top gas channel 303 (externally connected cylinder body), flows through fine holes of the inner-layer porous sleeve 306, and can achieve the directional high-strength penetration, the disorder and turbulent status of the gas in the regular supercritical fluid external circulation process is firstly solved, and the boiling, bleaching and dyeing effect is effectively guaranteed. The supercritical carbon dioxide fluid passes through the porous central pipe 307, and flows out through the bottom distributor 308, so as to finish the external circulation of boiling, bleaching and dyeing. In addition, the externally connected cylinder body is directly connected to the top end of the porous central pipe 307, the independent sealing mode required by each porous central pipe is changed, and the whole sealing to the porous central pipe is achieved, so as to avoid a fluid cutting-out phenomenon, and further strengthen the mass transfer effect of the fluid. When the carbon dioxide fluid flows in through the fluid inlet at the bottom of the boiling, bleaching and dyeing kettle, the carbon dioxide firstly enters the bottom distributor 308 and flows into the porous central pipe 307 to conduct boiling, bleaching and dyeing production to the jute fiber on the carbon dioxide fluid. After the carbon dioxide fluid penetrates the jute fiber spindle, the carbon dioxide fluid enters the gas channel formed by the outer sleeve 305 and the inner-layer sleeve 306 through the inner-layer porous sleeve 306. The carbon dioxide fluid subsequently enters the top gas channel 303 and flows out through the gas inlet 302 (externally connected cylinder body) to finish the external circulation of boiling, bleaching and dyeing.

The dye vessel comprises a dye cylinder, the bottom end and the top end thereof are respectively provided with a carbon dioxide fluid inlet 502 and a charging opening, the carbon dioxide fluid inlet 502 is connected to the carbon dioxide gas inlet 401 of the dye cylinder; and a valve III 511, a material mixing bin II 510, a valve II 509, a material mixing bin I 508, a valve I 507 and a charging bin 506 are successively arranged from the outlet to the top.

The bottom of the dye cylinder body is provided with the gas inlet 401, the cylinder body is internally provided with the central pipe connecting plate 403, the multi-hole distribution plate 405 and the top multi-hole distribution plate 406 from bottom to top, and the central pipe connecting plate 403 above, the multi-hole distribution plate 405 and the top multi-hole distribution plate 406 are all fixed with the circumference in the cylinder body; a cavity between the bottom end of the cylinder body and the central pipe connecting plate 403 forms the bottom gas channel 402; the central pipe connecting plate 403 is provided with the porous pipe 404 communicated with the bottom gas channel 402, the porous pipe 404 is the bottom opening, the top end is in a closed structure, and the pipe wall of the porous pipe 404 is provided with the through hole; the multi-hole distribution plate 405 is provided with the through holes; the central area of the top multi-hole distribution plate 406 is in a sealing structure for sealing the top end of the porous pipe 404, and the periphery is in a multi-hole annular structure; and the top of the cylinder body is provided with the gas outlet 408, and the cavity formed by the top of the cylinder body and the top multi-hole distribution plate 406 is a top gas mixing channel 407. The working principle is that: before boiling, bleaching and dyeing, the dye is added in the porous pipe 404, the dye cylinder is then placed in the boiling, bleaching and dyeing kettle, and the gas inlet 401 of the dye cylinder is connected to the carbon dioxide fluid inlet 502 at the bottom of the dye vessel. During the boiling, bleaching and dyeing production, the supercritical carbon dioxide enters the bottom gas channel 402 of the dye cylinder through the gas inlet 401 firstly, and then flows in the porous pipe 404 connected to the central pipe connecting plate 403; the carbon dioxide dissolved with the dye or auxiliary penetrates through the fine holes in the surface of the porous pipe 404 and enters the gas channels among the central pipe connecting plate 403, the multi-hole distribution plate 405, and the top multi-hole distribution plate 406; and meanwhile, the carbon dioxide fluid between the central pipe connecting plate 403 and the multi-hole distribution plate 405 can flow through the fine holes in the multi-hole distribution plate 405 to enter the gas channel between the multi-hole distribution plate 405 and the top multi-hole distribution plate 406. The outer edge of the top multi-hole distribution plate 406 is in an annular multi-hole structure, and the central part is in a closed structure and is formed with the top end of the porous pipe 404, so as to avoid the cutting-out phenomenon in the flowing process of the fluid. The carbon dioxide fluid dissolved with the dye or the auxiliary enters the top gas mixing channel 407 through the outer edges of the multi-holes of the top multi-hole distribution plate 406, and flows out through the gas outlet to enter the boiling, bleaching and dyeing kettles, and the jute fiber yarn cylinder 309 is boiled, bleached and dyed. The porous pipe 404, the multi-hole distribution plate 405 and the top gas mixing channel 407 in the dye cylinder can maximally disperse the dye in the dye cylinder to increase the dissolvability of the carbon dioxide fluid in unit volume, which is in favor of the processing of high quality and uniform dyeing to the jute fiber rough yarn.

The working principle of the dye vessel is that: the carbon dioxide fluid flows into the dye vessel through the carbon dioxide fluid inlet 502, and enters the dye cylinder to dissolve the dye or the auxiliary in the dye cylinder. The supercritical carbon dioxide fluid dissolved with the dye or the auxiliary flows out through the carbon dioxide fluid outlet 503, and enters the pipeline connected to the boiling, bleaching and dyeing kettle, so as to be provided for boiling, bleaching and dyeing production. In the boiling, bleaching and dyeing process, the color blending dye of a certain mass and other auxiliaries are added in the charging bin, the valve I 507 is firstly opened, the dye or the auxiliary is injected into the material mixing bin I 508, and when the dye or the auxiliary fully enters the material mixing bin I 508, the valve I 507 is closed. The valve II 509 is slowly opened, so that the dye or the auxiliary in the material mixing bin I 508 is injected into the material mixing bin II 510, and the valve II 509 is subsequently closed. The valve III 511 is slowly opened, so that the carbon dioxide fluid slowly flows into the material mixing bin II 510 to dissolve the dye. After the pressure in the material mixing bin II 510 is balanced with the dye vessel, the valve III 511 is fully opened to realize the communication of the material mixing bin II 510 and the dye vessel, so as to finish the addition of the dye or the auxiliary into the dye vessel.

The technology route of boiling, bleaching and dyeing by the device above is as follows:

The carbon dioxide is stored in the carbon dioxide storage tank 9, the bio-enzyme boiling and bleaching agent is placed in the co-solvent tank 10, the dye is placed into the dye vessel 15, the jute fiber rough yarn spindle 309 is placed on the boiling, bleaching and dyeing unit, and is placed into the boiling, bleaching and dyeing kettle. The carbon dioxide firstly flows out from the carbon dioxide storage tank 9, and flows in the ultrasonic atomizer 12. The bio-enzyme boiling and bleaching agent is atomized under the effect of the ultrasonic atomizer 12, and is fully mixed with the flowed carbon dioxide in the multi-hole gas-liquid distributor. The carbon dioxide uniformly dissolved with the bio-enzyme boiling and bleaching agent enters a supercritical status under the effect of the heater 14, and is injected into the dye vessel 15 or the boiling, bleaching and dyeing kettle 16 and 17 (the dye vessel 15 or the boiling, bleaching and dyeing kettle 16 and 17 are called as the supercritical device for anhydrous boiling, bleaching and dyeing in the following text) under the effect of the booster pump 13. The supercritical carbon dioxide uniformly dispersed with the bio-enzyme boiling and bleaching agent flows into the boiling, bleaching and dyeing kettles 16 and 17, and the internal circulation and external circulation boiling, bleaching and dyeing is firstly conducted to the jute fiber rough yarn under the effect of the magnetic circulation pump 18. Subsequently, the magnetic circulation pump 18 is closed, the booster pump 13 is opened to enable the carbon dioxide in the carbon dioxide storage tank 9 to enter the boiling, bleaching and dyeing kettles 16 and 17 to conduct the boiling and bleaching-separation procedure, the carbon dioxide further enters the separator 21 to conduct the separation procedure, so that the boiling and bleaching effect is further increased, and the boiling and bleaching product is separated to avoid the effect on the dyeing procedure.

After the boiling and bleaching-separation is finished, the co-solvent tank 10 is closed, so that the carbon dioxide flowed out from the carbon dioxide storage tank 9 enters the dye vessel 15 through the booster pump 13 and the heater 14 after passing through the ultrasonic atomizer 12, the heating system is used to heat up the dye vessel 15 and the boiling, bleaching and dyeing kettles 16 and 17, the temperature of the kettle body is increased to meet the requirement on dyeing, and the bio-enzyme in the kettle body is inactivated to avoid the effect thereof on dyeing. During dyeing processing, the dye kettle 15 is connected into the boiling, bleaching and dyeing system firstly, then the carbon dioxide in the carbon dioxide storage tank 9 flows out to be injected into the interior of the supercritical device for anhydrous boiling, bleaching and dyeing under the effect of the booster pump 13, and enters a supercritical status under the effect of the heater 14. The supercritical carbon dioxide firstly flows into the dye vessel 15 to dissolve the dye in the dye vessel, and then enters the boiling, bleaching and dyeing kettles 16 and 17 to dye the jute fiber rough yarn in the boiling, bleaching and dyeing kettles, and internal dyeing and external dyeing processing is conducted to the jute fiber rough yarn under the effect of the magnetic circulation pump 18. After the dyeing is finished, the supercritical carbon dioxide dissolved with the dye, and the boiling and bleaching target is firstly cooled in the cooler 20, and then enters the separator 21 for separation, the gas and solid components are completely separated under the effect of a separation bed, and the dye, boiling and bleaching target and other solid components are deposited at the bottom of the separator 21. Meanwhile, in order to achieve the complete separation of the dye and other solid materials, the boiling and bleaching target gas is adsorbed again in the adsorption vessel 22. The gas carbon dioxide is subsequently recycled by the cyclic refrigerating system to enter into the carbon dioxide storage tank 9 for use in next time.

The test method in the following embodiment is as follows: GB/T3921-2008 color fastness to soaping of textile color fastness test, GB/T3920-2008 color fastness to rubbing of textile color fastness test, and GB/T8427-2008 color fastness to artificial light resistance of textile color fastness test: xenon arc.

Embodiment 1

Carbon dioxide was stored in a carbon dioxide storage tank 9, 2% o.w.f (2% o.w.f referred to that a bio-enzyme compounded boiling and bleaching agent was 2% in mass percentage respect to jute rough yarns) bio-enzyme compounded boiling and bleaching agent (the bio-enzyme compounded boiling and bleaching agent was composed of the following components including xylanase, glucose oxidase, pectinase and alkyl polyglycoside (APG) in a mass ratio of 2:1:1:2) was placed into a co-solvent tank 10, 2% o.w.f curcumin was placed into a dye cylinder and then placed into a dye vessel 15, a 500 kg flax rough yarn spindle is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent was injected into the ultrasonic atomizer 12 through a co-solvent inlet under the effect of a fluid delivery pump 11, and was atomized under the vibration of an ultrasonic generator 201, the bio-enzyme boiling and bleaching agent in an atomized status entered a porous central pipe 205 connected to a porous pipe distribution plate 1203 and flowed out along small holes; and the carbon dioxide entered a gas channel 208 through a gas inlet 207, entered a porous cylinder 204 connected to a porous pipe distribution plate II 206 through the porous pipe distribution plate II 206, and flowed out along small holes, so that gaseous and liquid phases were sufficiently mixed in a multi-hole liquid-gas distributor. The gas-liquid mixed fluid entered the boiling and bleaching system through a gas outlet 209. The carbon dioxide uniformly dissolved with the bio-enzyme boiling and bleaching agent entered a supercritical status under the effect of a heater 14, and was injected into the interior of a supercritical device for anhydrous boiling, bleaching and dyeing under the effect of a booster pump 13. The supercritical carbon dioxide fluid uniformly dispersed with the bio-enzyme boiling and bleaching agent flowed into the interiors of boiling, bleaching and dyeing kettles 16 and 17 through a fluid inlet 310 at the bottom of the boiling, bleaching and dyeing kettle, respectively flowed into the porous central pipe 307 through the bottom distributor 308, and flowed out through the fine holes of the porous central pipes 307 to boil and bleach the flax rough yarns, the carbon dioxide fluid flowed through the small holes of an inner-layer multi-hole sleeve 306 of the externally connected cylinder body to enter a top gas channel 303 of the externally connected cylinder body, and then pass through top gas channel 303 and enter the fluid outlet of the boiling, bleaching and dyeing kettle through the gas inlet 302; under the effect of a magnetic circulation pump 18, the carbon dioxide fluid entered the boiling, bleaching and dyeing kettles 16 and 17 again to realize cyclic boiling and bleaching. After boiling and bleaching for 30 min under the conditions of 50° C. and 22 MPa, the magnetic circulation pump 18 was closed, and the booster pump 13 was opened. The boiling and bleaching-separation was kept for 30 min under the conditions of 50° C. and 22 MPa (the "boiling and bleaching-separation" referred to that the booster pump 13 was opened to enable the fresh supercritical carbon dioxide to enter the boiling, bleaching and dyeing kettles 16 and 17, and use the fresh supercritical carbon dioxide to conduct boiling and bleaching, and the materials in the boiling, bleaching and dyeing kettles 16 and 17 were successively sent into a separator 21 for separation during boiling and bleaching), the supercritical carbon dioxide fluid was cooled in a cooler 20 firstly, and then entered the separator 21 for separation, and the gas and solid components were completely separated under the effect of a separation bed. The boiling and bleaching target and other solid components were deposited at the bottom of the separator 21, while the gaseous carbon dioxide was completely adsorbed and purified through an adsorption vessel 22, and the clean carbon dioxide was recycled to enter the carbon dioxide storage tank 9 through a cyclic refrigerating system finally.

After the boiling and bleaching procedure was finished, the co-solvent system was closed (referring to that the co-solvent tank 10 and the ultrasonic atomizer 12 were closed, so that the co-solvent did not enter the ultrasonic atomizer 12, while the carbon dioxide gas passed through the ultrasonic atomizer 12 and then entered the dye vessel 15). The heating system was used to heat up the dye vessel 15 and the boiling, bleaching and dyeing kettles 16 and 17. During dyeing processing, the dye vessel 15 is connected into the boiling, bleaching and dyeing system firstly, then the carbon dioxide in the carbon dioxide storage tank 9 flowed out to enter a supercritical status under the effect of the heater 14, and was injected into the interior of the supercritical device for anhydrous boiling, bleaching and dyeing under the effect of the booster pump 13. The supercritical carbon dioxide fluid entered a bottom gas channel 402 of the dye cylinder through a gas inlet 401 firstly, and then entered a porous pipe 404 connected to a central pipe connecting plate 403; the carbon dioxide dissolved with the dye penetrated through the fine holes in the surface of the porous pipe 404 and entered the gas channels among the central pipe connecting plate 403, a multi-hole distribution plate 405, and a top multi-hole distribution plate 406; and meanwhile, the carbon dioxide fluid between the central pipe connecting plate 403 and the multi-hole distribution plate 406 could flow through the fine holes in the multi-hole distribution plate 405 to enter the gas channel between the multi-hole distribution plate 405 and the top multi-hole distribution plate 406. The carbon dioxide fluid dissolved with the dye entered a top gas mixing channel 407 through the outer edges of the multi-holes of the top multi-hole distribution plate 406, and flowed out through a gas outlet 408 to enter the boiling, bleaching and dyeing kettles 16 and 17. During boiling, bleaching and dyeing kettle, the carbon dioxide respectively flowed into the porous central pipes 307 through the bottom distributor 308, and flowed out through the fine holes of the porous central pipes 307 to dye the jute fiber rough yarns, the carbon dioxide fluid flowed through the small holes of the inner-layer multi-hole sleeve 306 of the externally connected cylinder body to enter the gas channel of the externally connected cylinder body, and then passed through the top gas channel and entered the fluid outlet of the boiling, bleaching and dyeing kettle through the gas inlet 302; under the effect of the magnetic circulation pump 18, the carbon dioxide fluid entered the boiling, bleaching and dyeing kettles 16 and 17 again to realize internal circulation of dyeing. After dyeing for 60 min under the conditions of 100° C. and 24 MPa, the supercritical carbon dioxide fluid was firstly cooled in the cooler 20, and then entered the separator 21 for separation, and the gas and solid components were completely separated under the effect of the separation bed. The dye, boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system for use in next time finally.

Through detection, the white degree of the flax rough yarns after boiling and bleaching was 50, and the residual gum content was 22%. Meanwhile, the K/S value of the dyed flax rough yarns was 6.2, the standard deviation of the K/S value was lower than 0.02, and the dyed flax rough yarns had the characteristics of relatively good level dyeing property and reproducibility. Meanwhile, the color fastness to washing of the dyed flax rough yarns was grade 4, the fastness to dry grinding was grade 4-5, the fastness to wet grinding was grade 4-5, and the color fastness to solarization was grade 6.

Embodiment 2

Carbon dioxide was stored in a carbon dioxide storage tank 9, 4% o.w.f bio-enzyme compounded boiling and bleaching agent (the bio-enzyme compounded boiling and bleaching agent was composed of the following components including xylanase, glucose oxidase, pectinase and alkyl polyglycoside (APG) in a mass ratio of 2:1:1:2) was placed into a co-solvent tank 10, 1% o.w.f. alkannin was placed into a dye cylinder and then placed into a dye vessel 15, a 500 kg apocynum venetum rough yarn spindle is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent of the co-solvent system in the co-solvent tank 10 was firstly injected into an atomization chamber 202 under the effect of a fluid delivery pump 11, an ultrasonic generator 201 in the co-solvent tank enabled the bio-enzyme boiling and bleaching agent to be atomized, and the atomized bio-enzyme boiling and bleaching agent was fully mixed with the flowed carbon dioxide in the multi-hole gas-liquid distributor. The carbon dioxide uniformly dissolved with the bio-enzyme boiling and bleaching agent entered a supercritical status under the effect of a heater 14, and was injected into the interior of a supercritical device for anhydrous boiling, bleaching and dyeing under the effect of a booster pump 13. The supercritical carbon dioxide fluid uniformly dispersed with the bio-enzyme boiling and bleaching agent flowed into the boiling, bleaching and dyeing kettles from the top fluid outlet of the boiling, bleaching and dyeing kettle to enter the gas inlet 301 of the boiling, bleaching and dyeing unit, the carbon dioxide fluid uniformly dispersed with the bio-enzyme boiling and bleaching agent entered the gas channel composed of an outer sleeve 305 and an inner-layer multi-hole sleeve 306 through the top gas channel 303 of the boiling, bleaching and dyeing unit, and the jute fiber rough yarn is boiled and bleached through the inner-layer multi-hole sleeve 306; the carbon dioxide fluid entered the porous central pipe 307 through a cone yarn porous pipe (the cone yarn porous pipe was the spindle where the cone yarn is twined) to enter the porous central pipe 307, and passed through a bottom distributor 308 and a fluid inlet 310 at the bottom of the boiling, bleaching and dyeing kettle in sequence, and under the effect of the magnetic circulation pump 18, the carbon dioxide fluid entered the top fluid outlet of the boiling, bleaching and dyeing kettle again to realize cyclic boiling and bleaching. After boiling and bleaching for 90 min under the conditions of 60° C. and 20 MPa, the boiling and bleaching-separation was kept for 30 min under the condition of 60° C. and 20 MPa, the supercritical carbon dioxide fluid was firstly cooled in the cooler 20, and then entered the separator 21 for separation, and the gas and solid components were completely separated under the effect of the separation bed. The boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system finally.

After the boiling and bleaching procedure was finished, the co-solvent system was closed. The heating system was used to heat up the dye vessel 15 and the boiling, bleaching and dyeing kettles 16 and 17. During dyeing processing, the dye vessel 15 was connected into the boiling, bleaching and dyeing system firstly, then the carbon dioxide in the carbon dioxide storage tank 9 flowed out to enter a supercritical status under the effect of the heater 14, and was injected into the interior of the supercritical device for anhydrous boiling, bleaching and dyeing under the effect of the booster pump 13. The supercritical carbon dioxide fluid entered a bottom gas channel 402 of the dye cylinder through a gas inlet 401 firstly, and then entered a porous pipe 404 connected to a central pipe connecting plate 403; the carbon dioxide dissolved with the dye penetrated through the fine holes in the surface of the porous pipe 404 and entered the gas channels among the central pipe connecting plate 403, a multi-hole distribution plate 405, and a top multi-hole distribution plate 406; and meanwhile, the carbon dioxide fluid between the central pipe connecting plate 403 and the multi-hole distribution plate 406 could flow through the fine holes in the multi-hole distribution plate 405 to enter the gas channel between the multi-hole distribution plate 405 and the top multi-hole distribution plate 406. The carbon dioxide fluid dissolved with the dye entered a top gas mixing channel 407 through the outer edges of the multi-holes of the top multi-hole distribution plate 406, and flowed out through a gas outlet 408 to enter the boiling, bleaching and dyeing kettles 16 and 17. During boiling, bleaching and dyeing kettle, the carbon dioxide fluid flowed into the boiling, bleaching and dyeing kettle through the top fluid outlet of the boiling, bleaching and dyeing kettle to enter the gas inlet 302 of the boiling, bleaching and dyeing unit, the carbon dioxide fluid uniformly dispersed with the dye entered the gas channel formed by the outer sleeve 307 and the inner-layer multi-hole sleeve 306 through the top gas channel 303 of the boiling, bleaching and dyeing unit, and the jute fiber rough yarn is dyed through the inner-layer multi-hole sleeve 306; and the carbon dioxide fluid entered the porous central pipe 307 through the cone yarn porous pipe, and passed through a bottom distributor 308 and a fluid inlet 310 at the bottom of the boiling, bleaching and dyeing kettle in sequence, and under the effect of the magnetic circulation pump 18, the carbon dioxide fluid entered the top fluid outlet of the boiling, bleaching and dyeing kettle again to realize cyclic boiling and bleaching. After dyeing for 60 min under the conditions of 110° C. and 22 MPa, the supercritical carbon dioxide fluid was firstly cooled in the cooler 20, and then entered the separator 21 for separation, and the gas and solid components were completely separated under the effect of the separation bed. The dye, boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system for use in next time finally.

Through detection, the white degree of the apocynum venetum rough yarns after boiling and bleaching was 45, and the residual gum content was 20%. Meanwhile, the K/S value of the dyed apocynum venetum rough yarns was 5.5, the standard deviation of the K/S value was lower than 0.01, and the dyed apocynum venetum rough yarns had the characteristics of relatively good level dyeing property and reproducibility. Meanwhile, the color fastness to washing of the dyed flax rough yarns was grade 4-5, the fastness to dry grinding was grade 4-5, the fastness to wet grinding was grade 4-5, and the color fastness to solarization was grade 6.

Embodiment 3

Carbon dioxide was stored in a carbon dioxide storage tank 9, 1% o.w.f xylanase bio-enzyme boiling and bleaching agent is placed into a co-solvent tank, 1% o.w.f active dispersed bright red R is placed into a dye cylinder and then placed into a dye vessel 15, a 200 kg ramie rough yarn spindle is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent of the co-solvent system in the co-solvent tank 10 was firstly injected into an atomization chamber 202 under the effect of a fluid delivery pump 11, an ultrasonic generator 201 in the co-solvent tank enabled the bio-enzyme boiling and bleaching agent to be atomized, and the atomized bio-enzyme boiling and bleaching agent was fully mixed with the flowed carbon dioxide in the multi-hole gas-liquid distributor. The carbon dioxide uniformly dissolved with the bio-enzyme boiling and bleaching agent entered a supercritical status under the effect of a heater 14, and was injected into the interior of a boiling, bleaching and dyeing device under the effect of a booster pump 13. The supercritical carbon dioxide fluid uniformly dispersed with the bio-enzyme boiling and bleaching agent flowed into the interiors of a boiling, bleaching and dyeing unit through a fluid inlet 310 at the bottom of the boiling, bleaching and dyeing kettle, respectively flowed into the porous central pipe 307 through the bottom distributor 308, and flowed out through the fine holes of the porous central pipes 307 to boil and bleach the jute fiber rough yarns, the carbon dioxide fluid flowed through the small holes of an inner-layer multi-hole sleeve 306 of the externally connected cylinder body to enter a gas channel of the externally connected cylinder body, and then pass through top gas channel 303 and enter the fluid outlet of the boiling, bleaching and dyeing kettle through the gas inlet 302; under the effect of a magnetic circulation pump 18, the carbon dioxide fluid entered the boiling, bleaching and dyeing kettles 16 and 17 again to realize inner cyclic boiling and bleaching. After boiling and bleaching for 30 min under the conditions of 50° C. and 22 MPa, the moving direction of the fluid was changed, so that the supercritical carbon dioxide fluid flowed into the boiling, bleaching and dyeing kettles 16 and 17 through the top fluid outlet of the boiling, bleaching and dyeing kettle to enter the gas inlet 301 of the boiling, bleaching and dyeing unit, the carbon dioxide fluid uniformly dispersed with the bio-enzyme boiling and bleaching agent entered the gas channel formed by the outer sleeve 307 and the inner-layer multi-hole sleeve 306 through the top gas channel 303 of the boiling, bleaching and dyeing unit, and the jute fiber rough yarn was boiled and bleached through the inner-layer multi-hole sleeve 306; and the carbon dioxide fluid entered the porous central pipe 307 through the cone yarn porous pipe, and passed through a bottom distributor 308 and a fluid inlet at the bottom of the boiling, bleaching and dyeing kettle in sequence, and under the effect of the magnetic circulation pump 18, the carbon dioxide fluid entered the top fluid outlet of the boiling, bleaching and dyeing kettle again to realize external cyclic boiling and bleaching for 30 min. The boiling and bleaching-separation was kept for 30 min under the conditions of 50° C. and 22 MPa, the supercritical carbon dioxide fluid was cooled in a cooler 20 firstly, and then entered the separator 21 for separation, and the gas and solid components were completely separated under the effect of a separation bed. The boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system finally.

The co-solvent system was subsequently closed. The heating system was used to heat up the dye vessel and the boiling, bleaching and dyeing kettles. During dyeing processing, the dye vessel 15 was connected into the boiling, bleaching and dyeing system firstly, then the carbon dioxide in the carbon dioxide storage tank 9 flowed out to enter a supercritical status under the effect of the heater 14, and was injected into the interior of the supercritical device for anhydrous boiling, bleaching and dyeing under the effect of the booster pump 13. The supercritical carbon dioxide fluid entered a bottom gas channel 402 of the dye cylinder through a gas inlet 401 firstly, and then entered a porous pipe 404 connected to a central pipe connecting plate 403; the carbon dioxide dissolved with the dye penetrated through the fine holes in the surface of the porous pipe 404 and entered the gas channels among the central pipe connecting plate 403, a multi-hole distribution plate 405, and a top multi-hole distribution plate 405; and meanwhile, the carbon dioxide fluid between the central pipe connecting plate 403 and the multi-hole distribution plate 405 could flow through the fine holes in the multi-hole distribution plate 405 to enter the gas channel between the multi-hole distribution plate 405 and the top multi-hole distribution plate 406. The carbon dioxide fluid dissolved with the dye entered a top gas mixing channel 407 through the outer edges of the multi-holes of the top multi-hole distribution plate 406, and flowed out through a gas outlet 408 to enter the boiling, bleaching and dyeing kettles 16 and 17. During the boiling, bleaching and dyeing kettles 16 and 17, the carbon dioxide respectively flowed into the porous central pipes 307 through the bottom distributor 308, and flowed out through the fine holes of the porous central pipes 307 to dye the jute fiber rough yarns, the carbon dioxide fluid flowed through the small holes of the inner-layer multi-hole sleeve 306 of the externally connected cylinder body to enter the gas channel of the externally connected cylinder body, and then passed through the top gas channel 303 and entered the fluid outlet of the boiling, bleaching and dyeing kettle through the gas inlet; under the effect of the magnetic circulation pump 18, the carbon dioxide fluid entered the boiling, bleaching and dyeing kettles 16 and 17 again to realize internal circulation of dyeing under 110° C. and 24 MPa. After dyeing for 30 min, the flowing direction of the fluid is changed, the carbon dioxide fluid flowed into the boiling, bleaching and dyeing kettle through the top fluid outlet of the boiling, bleaching and dyeing kettle to enter the gas inlet 302 of the boiling, bleaching and dyeing unit, the carbon dioxide fluid uniformly dispersed with the dye entered the gas channel formed by the outer sleeve 305 and the inner-layer multi-hole sleeve 306 through the top gas channel 303 of the boiling, bleaching and dyeing unit, and the jute fiber rough yarn is dyed through the inner-layer multi-hole sleeve 306; and the carbon dioxide fluid entered the porous central pipe 307 through the cone yarn porous pipe, and passed through a bottom distributor 308 and a fluid inlet at the bottom of the boiling, bleaching and dyeing kettle in sequence, and under the effect of the magnetic circulation pump 18, the carbon dioxide fluid entered the top fluid outlet of the boiling, bleaching and dyeing kettle again, so as to realize that after external circulation of dyeing for 30 min, the supercritical carbon dioxide fluid was firstly cooled in the cooler 20, and then entered the separator 21 for separation, and the gas and solid components were completely separated under the effect of the separation bed. The dye, boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system for use in next time finally.

Through detection, the white degree of the apocynum venetum rough yarns after boiling and bleaching was 48, and the residual gum content was 21%. Meanwhile, the K/S value of the dyed apocynum venetum rough yarns was 10.5, the standard deviation of the K/S value was lower than 0.01, and the dyed apocynum venetum rough yarns had the characteristics of relatively good level dyeing property and reproducibility. Meanwhile, the color fastness to washing of the dyed flax rough yarns was grade 4-5, the fastness to dry grinding was grade 4-5, the fastness to wet grinding was grade 4-5, and the color fastness to solarization was grade 6.

Embodiment 4

Carbon dioxide was stored in a carbon dioxide storage tank 9, 3% o.w.f pectin bio-enzyme boiling and bleaching agent was placed into a co-solvent tank, 1% o.w.f nailwort pigment was placed into a dye cylinder and then placed into a dye vessel 15, a 1,000 kg hemp cane yarn is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent of the co-solvent system in the co-solvent tank 10 was firstly injected into an atomization chamber 202 under the effect of a fluid delivery pump 11, an ultrasonic generator 201 in the co-solvent tank enabled the bio-enzyme boiling and bleaching agent to be atomized, and the atomized bio-enzyme boiling and bleaching agent was fully mixed with the flowed carbon dioxide in the multi-hole gas-liquid distributor. The carbon dioxide uniformly dissolved with the bio-enzyme boiling and bleaching agent entered a supercritical status under the effect of a heater 14, and was injected into the interior of a boiling, bleaching and dyeing device under the effect of a booster pump 13. The supercritical carbon dioxide fluid uniformly dispersed with the bio-enzyme boiling and bleaching agent flowed into the interiors of a boiling, bleaching and dyeing unit through a fluid inlet 310 at the bottom of the boiling, bleaching and dyeing kettle, respectively flowed into the porous central pipe 307 through the bottom distributor 308, and flowed out through the fine holes of the porous central pipes 307 to boil and bleach the jute fiber rough yarns, the carbon dioxide fluid flowed through the small holes of an inner-layer multi-hole sleeve 306 of the externally connected cylinder body to enter a gas channel of the externally connected cylinder body, and then pass through top gas channel 303 and enter the fluid outlet of the boiling, bleaching and dyeing kettle through the gas inlet; under the effect of a magnetic circulation pump 18, the carbon dioxide fluid entered the boiling, bleaching and dyeing kettles again to conduct boiling and bleaching circulation for 90 min under the condition of 40° C. and 22 MPa. In this process, a fine adjustment valve was slowly opened to sample the carbon dioxide fluid in the boiling, bleaching and dyeing system, a fluid sample was detected by an infrared detector to determine the content of the boiling and bleaching target in the fluid, and a dissolved status in the fluid was imaged and the data was displayed through an imaging system. The boiling and bleaching-separation was kept for 10 min under the conditions of 40° C. and 22 MPa, the supercritical carbon dioxide fluid was cooled in a cooler firstly, and then entered the separator 21 for separation, and the gas and solid components were completely separated under the effect of a separation bed. The boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system finally.

After the boiling and bleaching procedure was finished, the co-solvent system was closed. The heating system was used to heat up the dye kettle 15 and the boiling, bleaching and dyeing kettles 16 and 17. During dyeing processing, the dye vessel 15 was connected into the boiling, bleaching and dyeing system firstly, then the carbon dioxide in the carbon dioxide storage tank 9 flowed out to enter a supercritical status under the effect of the heater 14, and was injected into the interior of the supercritical device for anhydrous boiling, bleaching and dyeing under the effect of the booster pump 13. The supercritical carbon dioxide fluid entered a bottom gas channel 402 of the dye cylinder through a gas inlet firstly, and then entered a porous pipe 404 connected to a central pipe connecting plate 403; the carbon dioxide dissolved with the dye penetrated through the fine holes in the surface of the porous pipe 404 and entered the gas channels among the central pipe connecting plate 403, a multi-hole distribution plate 405, and a top multi-hole distribution plate 406; and meanwhile, the carbon dioxide fluid between the central pipe connecting plate 403 and the multi-hole distribution plate 405 could flow through the fine holes in the multi-hole distribution plate 405 to enter the gas channel between the multi-hole distribution plate 405 and the top multi-hole distribution plate 406. The carbon dioxide fluid dissolved with the dye entered a top gas mixing channel 407 through the outer edges of the multi-holes of the top multi-hole distribution plate 406, and flowed out through a gas outlet 408 to enter the boiling, bleaching and dyeing kettles. During the boiling, bleaching and dyeing kettles 16 and 17, the carbon dioxide respectively flowed into the porous central pipes 307 through the bottom distributor 308, and flowed out through the fine holes of the porous central pipes 307 to dye the jute fiber rough yarns, the carbon dioxide fluid flowed through the small holes of the inner-layer multi-hole sleeve 306 of the externally connected cylinder body to enter the gas channel of the externally connected cylinder body, and then passed through the top gas channel and entered the fluid outlet of the boiling, bleaching and dyeing kettle through the gas inlet; under the effect of the magnetic circulation pump 18, the carbon dioxide fluid entered the boiling, bleaching and dyeing kettles again to realize the circulation of dyeing under the condition of 120° C. and 25 MPa. In this process, a fine adjustment valve was slowly opened to sample the carbon dioxide fluid in the boiling, bleaching and dyeing system, a fluid sample was detected by an infrared detector to determine the dissolvability of the dye in the fluid, and a dissolved status of the dye in the fluid was imaged and the data was displayed through an imaging system. After the dyeing was finished, the supercritical carbon dioxide fluid was firstly cooled in the cooler 20, and then entered the separator 21 for separation, and the gas and solid components were completely separated under the effect of the separation bed. The dye, boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system for use in next time finally.

Through detection, the white degree of the apocynum venetum rough yarns after boiling and bleaching was 46, and the residual gum content was 20%. Meanwhile, the K/S value of the dyed apocynum venetum rough yarns was 8.3, the standard deviation of the K/S value was lower than 0.02, and the dyed apocynum venetum rough yarns had the characteristics of relatively good level dyeing property and reproducibility. Meanwhile, the washing color resistance fastness of the dyed flax rough yarn is 4 grade, the dry grinding resistance fastness is 4 grade, the wet grinding resistance fastness is 4-5 grade, and the solarization color resistance fastness is 6 grade.

Embodiment 5

Carbon dioxide was stored in a carbon dioxide storage tank 9, 1% o.w.f hemicellulase bio-enzyme boiling and bleaching agent was placed into a co-solvent tank, 5% o.w.f purple sweet potato pigment was placed into a dye cylinder and then placed into a dye kettle 15, a 800 kg flax spindle is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent of the co-solvent system in the co-solvent tank 10 was firstly injected into an atomization chamber 202 under the effect of a fluid delivery pump 11, an ultrasonic generator 201 in the co-solvent tank enabled the bio-enzyme boiling and bleaching agent to be atomized, and the atomized bio-enzyme boiling and bleaching agent was fully mixed with the flowed carbon dioxide in the multi-hole gas-liquid distributor. The carbon dioxide uniformly dissolved with the bio-enzyme boiling and bleaching agent entered a supercritical status under the effect of a heater 14, and was injected into the interior of a boiling, bleaching and dyeing device under the effect of a booster pump 13. The supercritical carbon dioxide fluid uniformly dispersed with the bio-enzyme boiling and bleaching agent flowed into the boiling, bleaching and dyeing kettles 16 and 17 from the top fluid outlet of the boiling, bleaching and dyeing kettle to enter the gas inlet 302 of the boiling, bleaching and dyeing unit, the carbon dioxide fluid uniformly dispersed with the bio-enzyme boiling and bleaching agent entered the gas channel composed of an outer sleeve 307 and an inner-layer multi-hole sleeve 306 through the top gas channel 30 of the boiling, bleaching and dyeing unit, and the jute fiber rough yarn was boiled and bleached through the inner-layer multi-hole sleeve 306; the carbon dioxide fluid entered the porous central pipe 307 through a cone yarn porous pipe, and passed through a bottom distributor 308 and a fluid inlet 310 at the bottom of the boiling, bleaching and dyeing kettle in sequence, and under the effect of the magnetic circulation pump 18, the carbon dioxide fluid entered the top fluid outlet of the boiling, bleaching and dyeing kettle again to conduct the boiling and bleaching circulation for 70 min under the condition of 40° C. and 22 Mpa to realize the boiling and bleaching circulation. The boiling and bleaching-separation was kept for 20 min under the conditions of 40° C. and 22 MPa, the supercritical carbon dioxide fluid was cooled in a cooler 20 firstly, and then entered the separator 21 for separation, and the gas and solid components were completely separated under the effect of a separation bed. The boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system finally.

After the boiling and bleaching procedure was finished, the co-solvent system was closed. The heating system was used to heat up the dye kettle 15 and the boiling, bleaching and dyeing kettles 16 and 17. During dyeing processing, the dye vessel 15 was connected into the boiling, bleaching and dyeing system firstly, then the carbon dioxide in the carbon dioxide storage tank 9 flowed out to enter a supercritical status under the effect of the heater 14, and was injected into the interior of the supercritical device for anhydrous boiling, bleaching and dyeing under the effect of the booster pump 13. The supercritical carbon dioxide fluid entered a bottom gas channel 402 of the dye cylinder through a gas inlet firstly, and then entered a porous pipe 404 connected to a central pipe connecting plate 403; the carbon dioxide dissolved with the dye penetrated through the fine holes in the surface of the porous pipe 404 and entered the gas channels among the central pipe connecting plate 403, a multi-hole distribution plate 405, and a top multi-hole distribution plate 406; and meanwhile, the carbon dioxide fluid between the central pipe connecting plate 403 and the multi-hole distribution plate 405 could flow through the fine holes in the multi-hole distribution plate 405 to enter the gas channel between the multi-hole distribution plate 405 and the top multi-hole distribution plate 406. The carbon dioxide fluid dissolved with the dye entered a top gas mixing channel 407 through the outer edges of the multi-holes of the top multi-hole distribution plate 406, and flowed out through a gas outlet to enter the boiling, bleaching and dyeing kettles. During boiling, bleaching and dyeing kettles 16 and 17, the carbon dioxide fluid flowed into the boiling, bleaching and dyeing kettle through the top fluid outlet of the boiling, bleaching and dyeing kettle to enter the gas inlet 302 of the boiling, bleaching and dyeing unit, the carbon dioxide fluid uniformly dispersed with the dye entered the gas channel formed by the outer sleeve 307 and the inner-layer multi-hole sleeve 306 through the top gas channel of the boiling, bleaching and dyeing unit, and the jute fiber rough yarn was dyed through the inner-layer multi-hole sleeve 306; and the carbon dioxide fluid entered the porous central pipe 307 through the cone yarn porous pipe, and passed through a bottom distributor 308 and a fluid inlet 310 at the bottom of the boiling, bleaching and dyeing kettle in sequence, and under the effect of the magnetic circulation pump 18, the carbon dioxide fluid entered the top fluid outlet of the boiling, bleaching and dyeing kettle again to realize the external circulation of dyeing for 60 min under the condition of 110° C. and 26 MPa. After the dyeing is finished, the supercritical carbon dioxide fluid was firstly cooled in the cooler, and then entered the separator 21 for separation. A fine adjustment valve was slowly opened to sample the carbon dioxide fluid in separation and recovery system, a fluid sample was detected by an infrared detector to determine the separation status of the dye, the boiling and bleaching target, and the carbon dioxide in the fluid, and a solid-phase dissolved status in the fluid was imaged and the data was displayed through an imaging system. In the separation and recovery process, the gas and solid components were completely separated under the effect of a separation bed. The dye, boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system for use in next time finally.

Through detection, the white degree of the apocynum venetum rough yarns after boiling and bleaching was 47, and the residual gum content was 19%. Meanwhile, the K/S value of the dyed apocynum venetum rough yarns was 6.7, the standard deviation of the K/S value was lower than 0.02, and the dyed apocynum venetum rough yarns had the characteristics of relatively good level dyeing property and reproducibility. Meanwhile, the color fastness to washing of the dyed flax rough yarns was grade 4-5, the fastness to dry grinding was grade 4-5, the fastness to wet grinding was grade 4-5, and the color fastness to solarization was grade 6.

Embodiment 6

Carbon dioxide was stored in a carbon dioxide storage tank 9, 2% o.w.f glucose oxidase bio-enzyme boiling and bleaching agent was placed into a co-solvent tank, a 800 kg flax spindle is successively connected to and sleeved in porous central pipes 307 in a boiling and bleaching unit, is connected to a fluid inlet 310 at the bottom of a boiling, bleaching and dyeing kettle through a bottom distributor 308, and is connected to a fluid outlet of the boiling, bleaching and dyeing kettle through a gas inlet 302 of an externally connected cylinder body. The carbon dioxide flowed out from the carbon dioxide storage tank 9 firstly, and then flowed into an ultrasonic atomizer 12. The bio-enzyme boiling and bleaching agent of the co-solvent system in the co-solvent tank 10 was firstly injected into an atomization chamber 202 under the effect of a fluid delivery pump 11, an ultrasonic generator 201 in the co-solvent tank enabled the bio-enzyme boiling and bleaching agent to be atomized, and the atomized bio-enzyme boiling and bleaching agent was fully mixed with the flowed carbon dioxide in the multi-hole gas-liquid distributor. The carbon dioxide uniformly dissolved with the bio-enzyme boiling and bleaching agent entered a supercritical status under the effect of a heater 14, and was injected into the interior of a boiling, bleaching and dyeing device under the effect of a booster pump 13. The supercritical carbon dioxide fluid uniformly dispersed with the bio-enzyme boiling and bleaching agent flowed into the boiling, bleaching and dyeing kettles from the top fluid outlet of the boiling, bleaching and dyeing kettle to enter the gas inlet 302 of the boiling, bleaching and dyeing unit, the carbon dioxide fluid uniformly dispersed with the bio-enzyme boiling and bleaching agent entered the gas channel formed by an outer sleeve 307 and an inner-layer multi-hole sleeve 306 through the top gas channel 303 of the boiling, bleaching and dyeing unit, and the jute fiber rough yarn was boiled and bleached through the inner-layer multi-hole sleeve 306; the carbon dioxide fluid entered the porous central pipe 307 through a cone yarn porous pipe, and passed through a bottom distributor 308 and a fluid inlet 310 at the bottom of the boiling, bleaching and dyeing kettle in sequence, and under the effect of the magnetic circulation pump 18, the carbon dioxide fluid entered the top fluid outlet of the boiling, bleaching and dyeing kettle again to conduct the boiling and bleaching internal circulation for 30 min under the condition of 40° C. and 22 MPa. After boiling and bleaching for 30 min under the conditions of 50° C. and 22 Mpa, the moving direction of the fluid is changed, so that the supercritical carbon dioxide fluid flowed into the boiling, bleaching and dyeing kettles 16 and 17 through the top fluid outlet of the boiling, bleaching and dyeing kettle to enter the gas inlet 301 of the boiling, bleaching and dyeing unit, the carbon dioxide fluid uniformly dispersed with the bio-enzyme boiling and bleaching agent entered the gas channel formed by the outer sleeve 307 and the inner-layer multi-hole sleeve 306 through the top gas channel 303 of the boiling, bleaching and dyeing unit, and the jute fiber rough yarn was boiled and bleached through the inner-layer multi-hole sleeve 306; and the carbon dioxide fluid entered the porous central pipe 307 through the cone yarn porous pipe, and passed through a bottom distributor 308 and a fluid inlet at the bottom of the boiling, bleaching and dyeing kettle in sequence, and under the effect of the magnetic circulation pump 18, the carbon dioxide fluid entered the top fluid outlet of the boiling, bleaching and dyeing kettle again to realize external cyclic boiling and bleaching for 30 min. The boiling and bleaching-separation was kept for 40 min under the conditions of 40° C. and 22 Mpa, the supercritical carbon dioxide fluid was cooled in a cooler 20 firstly, and then entered the separator 21 for separation, and the gas and solid components were completely separated under the effect of a separation bed. The boiling and bleaching target and other solid components were deposited at the bottom of the separator 21, then the gas carbon dioxide was completely adsorbed and purified through the adsorption vessel 22, and the clean carbon dioxide was recycled to enter the carbon dioxide storage tank 9 through the cyclic refrigerating system finally.

After the boiling and bleaching procedure was finished, the co-solvent system was closed. The supercritical carbon dioxide fluid was firstly cooled in the cooler 20, and then entered the separator 21 for separation. A fine adjustment valve was slowly opened to sample the carbon dioxide fluid in separation and recovery system, a fluid sample was detected by an infrared detector to determine the separation status of the dye, the boiling and bleaching target, and the carbon dioxide in the fluid, and a solid-phase dissolved status in the fluid was imaged and the data was displayed through an imaging system. In the separation and recovery process, the gas and solid components were completely separated under the effect of a separation bed. The dye, boiling and bleaching target and other solid components were deposited at the bottom of the separator 21, then the gas carbon dioxide was completely adsorbed and purified through the adsorption vessel 22, and the clean carbon dioxide is recycled to enter the carbon dioxide storage tank 9 through the cyclic refrigerating system for use in next time finally.

Through detection, the white degree of the apocynum venetum rough yarns after boiling and bleaching was 48, and the residual gum content was 20%, which can meet the requirement on commercial dyeing.

The invention claimed is:
1. A system for anhydrous boiling, bleaching and dyeing using a supercritical carbon dioxide fluid, comprising:
   a carbon dioxide storage system for storing and/or producing carbon dioxide gas;
   a co-solvent tank for storing co-solvent;
   an ultrasonic atomizer fluidly connected to the carbon dioxide storage system and the co-solvent tank, wherein the ultrasonic atomizer is configured to atomize the co-solvent received from the co-solvent tank and to mix the atomized co-solvent with carbon dioxide received from the carbon dioxide storage system to form a mixed fluid;
   a booster pump fluidly connected to the ultrasonic atomizer and the carbon dioxide storage system, wherein the booster pump is configured to compress the mixed fluid produced in the ultrasonic atomizer, to compress carbon dioxide passing through the ultrasonic atomizer, or to compress carbon dioxide from the carbon dioxide storage system;
   a heater fluidly connected to the booster pump and configured to heat the mixed fluid compressed by the booster pump to produce a first supercritical fluid or to heat the carbon dioxide compressed by the booster pump to produce a second supercritical fluid;
   a dye vessel fluidly connected to the heater and configured to mix a dye with the first supercritical fluid or the second supercritical fluid;
   a boiling, bleaching and dyeing kettle fluidly connected to the heater and the dye vessel and configured to receive the first supercritical fluid, the second supercritical fluid, the first supercritical fluid containing the dye, or the second supercritical fluid containing the dye; and
   a separation system fluidly connected to the boiling, bleaching and dyeing kettle and configured to conduct gas-solid separation to a material stream received therefrom;
   wherein the ultrasonic atomizer comprises:
      a first chamber having an ultrasonic generator and a first inlet fluidly connected to the co-solvent tank;
      a second chamber having a second inlet fluidly connected to the carbon dioxide storage system;
      a third chamber having an outlet fluidly connected to the booster pump, a plurality of porous central pipes, and a plurality of porous cylinders;
      wherein the first chamber and the third chamber are separated by a first distribution plate, and the second chamber and the third chamber are separated by a second distribution plate;
      wherein the first distribution plate has a plurality of holes opening to the plurality of porous central pipes, and the second distribution plate has a plurality of holes opening to the plurality of porous cylinders; and
      wherein the mixed fluid is formed in the third chamber by the atomized co-solvent entering the third chamber through the plurality of porous central pipes and carbon dioxide entering the third chamber through the plurality of porous cylinders.

2. The system according to claim 1, further comprising a magnetic circulation pump fluidly connected to an inlet and an outlet of the boiling, bleaching and dyeing kettle.

3. The system according to claim 1, wherein the carbon dioxide storage system comprises a carbon dioxide storage tank fluidly connected to a carbon dioxide gas source through a gas delivery pump.

4. The system according to claim 3, wherein the separation system comprises a separator and a cooler fluidly connected to the boiling, bleaching and dyeing kettle and to the separator, wherein, during operation, the material stream from the boiling, bleaching and dyeing kettle is cooled in the cooler and fed to the separator, wherein the separator is fluidly connected to an adsorption vessel.

5. The system according to claim 4, further comprising a condenser fluidly connected to the adsorption vessel and to the carbon dioxide storage tank, wherein the condenser is configured to cool carbon dioxide received from the adsorption vessel.

6. The system according to claim 1, further comprising a heating system for providing a heat source.

7. The system according to claim 1, further comprising a refrigerating system for providing a cold source.

* * * * *